(No Model.) 4 Sheets—Sheet 1.

J. C. HENRY.
ELECTRIC LOCOMOTIVE.

No. 500,066. Patented June 20, 1893.

Witnesses:
George J. Bell
Robt. S. Hall

Inventor:
John C. Henry
By Knight Bros
Attys (No Model.) 4 Sheets—Sheet 2.
J. C. HENRY.
ELECTRIC LOCOMOTIVE.
No. 500,066. Patented June 20, 1893.
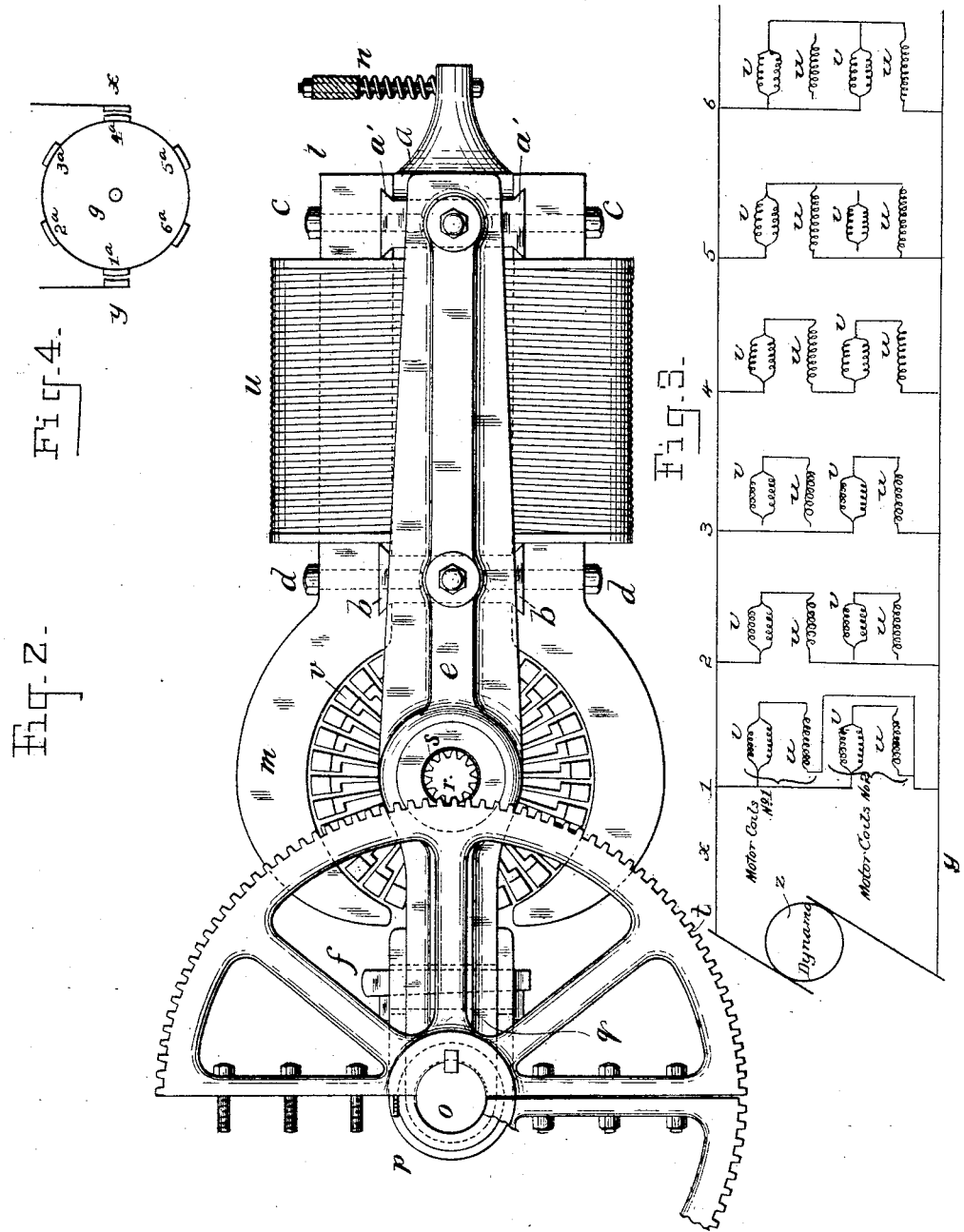

(No Model.) 4 Sheets—Sheet 3.

J. C. HENRY.
ELECTRIC LOCOMOTIVE.

No. 500,066. Patented June 20, 1893.

Witnesses  Inventor (No Model.) 4 Sheets—Sheet 4.

J. C. HENRY.
ELECTRIC LOCOMOTIVE.

No. 500,066. Patented June 20, 1893.

Witnesses
Wm H. Courtland
M. V. Bidgood

Inventor
John C. Henry
By Knight Bros.
Atty

UNITED STATES PATENT OFFICE.

JOHN C. HENRY, OF NEW YORK, N. Y.

ELECTRIC LOCOMOTIVE.

SPECIFICATION forming part of Letters Patent No. 500,066, dated June 20, 1893.

Application filed October 18, 1890. Serial No. 368,595. (No model.)

*To all whom it may concern:*

Be it known that I, JOHN C. HENRY, a citizen of the United States, residing in the city, county, and State of New York, have invented certain new and useful Improvements in Electric Motors, of which the following is a specification.

My invention relates to an electric motor especially intended for electric railway cars, and has in view the duplication of circuits so that in the event of accidental crosses or grounds the defective portion may be switched out; also provision of a motor adapted to a great range of duty, of simple construction with avoidance of multiplicity of parts, and conforming to fixed standards.

I will first describe the invention in connection with the accompanying drawings and then point out in the claims the novel features.

Figure 1:
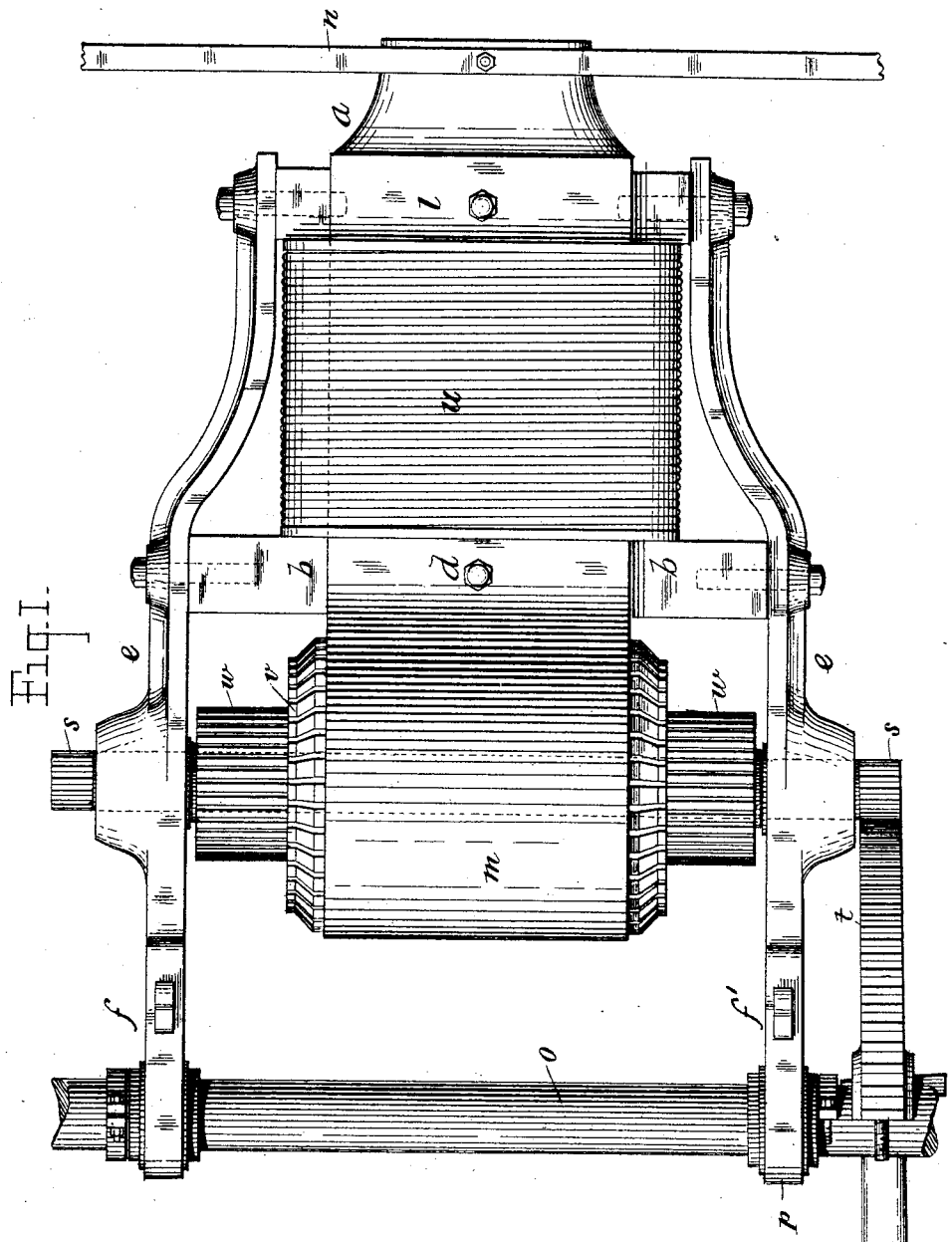
Figure 5:
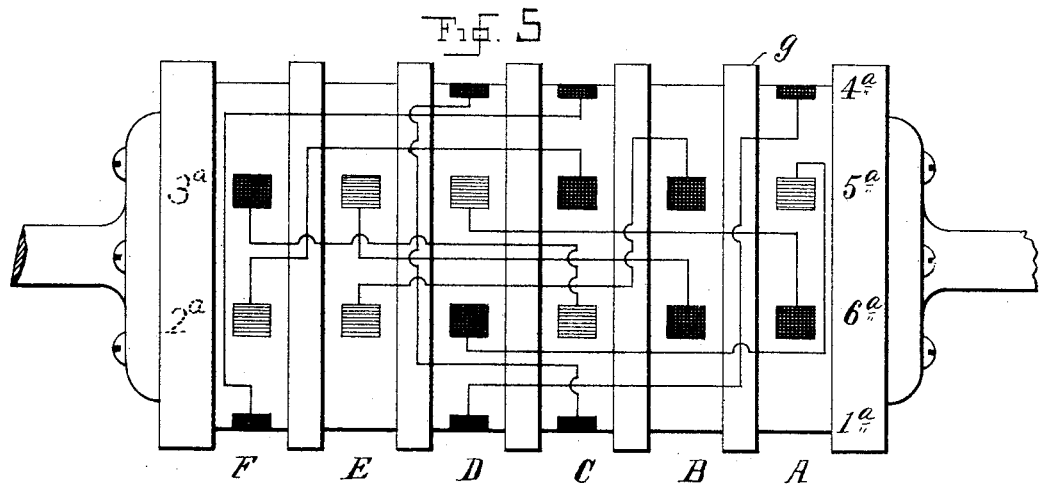

20. In said drawings: Figure 1 is a plan view of my improved duplex motor. Fig. 2 is a side elevation thereof. Fig. 3 is a diagram of the different ways of coupling the armature and field magnet coils of the double motor. Fig. 4 is an end view of a cylindrical switch for effecting said couplings. Fig. 5 is a side view of the switch cylinder showing the contact plates and the connections between them. The cylinder may be supposed to be composed of a transparent insulating material such as glass so that the contact plates will all show. Those on the side of the cylinder toward the observer are shown with dark cross hatching and those on the opposite side with light lines. Figs. 6 to 11 inclusive show diagrammatically the several positions of the cylinder and the circuit connections thereby made.

In the electric railway of today the ordinary practice is to use thirty inch car wheels and two motors, the armatures of which have normally a speed of twelve hundred revolutions per minute. Such armatures require a shaft about two and one-half inches in diameter. Now, it is impracticable to put a gear of more than twenty four inches on the car axles, or one of less than four inches on the motor shaft. As this would give a speed reduction of but six times, resort has been had to multiplicity of reducing gear between the motor shaft and car axles, in order that the speed of the car shall be brought within the usual legal limit, about eight miles per hour. I reduce the number of wearing parts and so lessen noise and cost of construction and repair by cutting pinion teeth directly on the motor shaft, preferably at both ends so that either end can be used by reversing the position of the armature. In this construction, with a motor shaft of say two and one-half inches in diameter, the pitch line of the pinion will be but two inches and as its teeth mesh directly with a twenty-four inch spur gear on the car axle, I obtain a speed reduction of twelve to one—the reduction which experience has shown to be the best.

I make each field magnet bar or core $l$ with its pole piece $m$ of one piece of iron. A yoke $a$ is dovetailed into each at the neutral point, as shown at $a'$ and projects sufficiently to afford means of supporting one end of the motor from the car by suspending devices $n$. A cross beam $b$ preferably of anti-magnetic material such as brass, is also dovetailed into said cores at $b'$ and firmly locked thereto by bolts $d$ also preferably of brass. By means of yokes $a$ and cross-beam $b$ one end of the motor is hung from side bars $e$ which are at one end bolted to yoke $a$ and at the other hung on the driving axle $o$, by means of straps $p$, brasses $q$ and gibs and keys $f$, so that the wear may be taken up. This arrangement permits of a close adjustment of the relation between the spur gear on the car axle and the pinion on the motor shaft, an essential point where noise is objectionable and high speed machinery is being dealt with. The side bars $e$ supply bearings for the motor armature shaft $r$, which has formed on it at each end the pinion $s$ gearing with large spur $t$ on the driving axle, as already described.

The field magnet coils $u$ and the armature $v$ are wound with two strands or two separate coils, the separate armature strands or coils being led to separate commutators $w$ preferably at opposite ends of the armature. The several terminals of the field and armature strands being independently led to a switch of the plan hereinafter described, I have in a single motor practically two field magnets and two armatures, with a capacity for the regulation of resistance therein which enables the current supply, and the torque and speed of the armature shaft to be controlled without waste of the energy by diminishing the force of the current in passing it through idle resistance. The counter-electromotive force and consequently the current supply may be changed without altering the speed of the armature.

The form of switch which I have devised for effecting the couplings of the motor circuits will now be described.

Figures 6, 7:
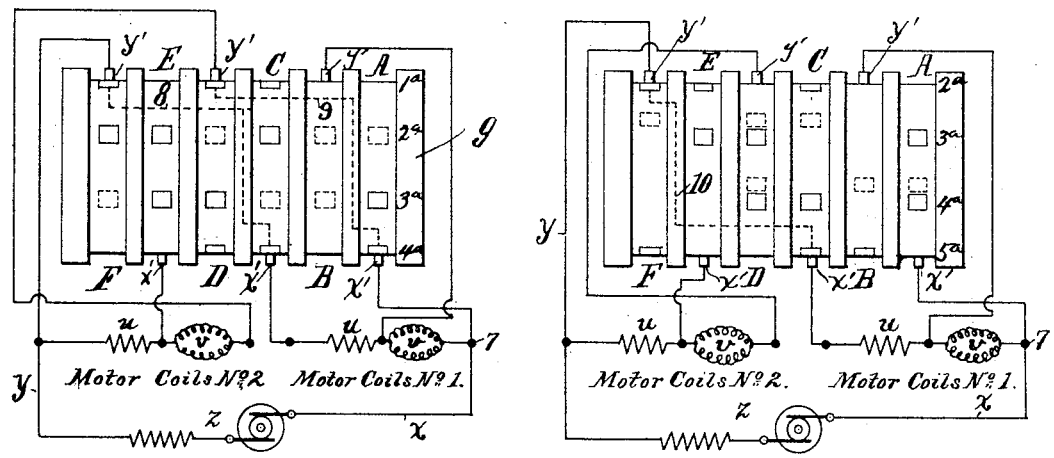

It is desired that the switch be capable of effecting the following combinations which are indicated in diagrammatic view, Fig. 3. By turning the switch the several connections indicated are successively thrown in. The connections are numbered on the diagram from 1 to 6. The dynamo is shown in diagram at $z$, the outgoing and return wires at $x$, $y$, the armature coils at $v$ and the field coils at $u$. The armature and field coils forming one complete motor circuit are shown throughout at the upper side of the diagram and are indicated as "motor coils No. 1," and those forming the other motor circuit are shown at the lower side of the diagram and marked "motor coils No. 2." When the switch is turned to the first position, the connections indicated at 1 in this figure are made and the motor circuits are in parallel. This connection is shown in full in Fig. 6. In this position both the motors are connected into the circuit so arranged as to do the greatest amount of work. The body $g$ of the switch is cylindrical and made of insulating material having six series of contact plates (indicated at $1^a$, $2^a$, $3^a$, $4^a$, $5^a$ and $6^a$, Figs. 4 and 5) on its periphery. Each series is made up of three plates. Two series of brushes $x'$, $y'$, make simultaneous contact with diametrically opposite contact plates. These brushes are arranged on each side of the cylinder and travel in alternate grooves A, B, C, D, E, F of said cylinder. These brushes form terminals of the motor and dynamo circuits. In Fig. 6, the connection is from dynamo $z$ through conductor $x$ to the armature terminal 7 of motor coils No. 1. Here the current divides, one part going through motor coils No. 1 to the contact brush $x'$ traveling in groove C, thence by the buried connection 8 to contact brush $y'$ in groove F and so by the wire return $y$ to the dynamo, while the other part passes to contact brush $x'$ running in groove A, thence by the buried wire connection 9 to the contact brush $y'$ running in groove D, thence to motor coils No. 2 and so to the return wire $y$. The contact brushes in grooves B and E are in contact with insulation only. The field magnet and armature winding of each motor circuit are thus connected in series while the two motor circuits are connected in parallel. The next positions of the switch cylinder are arranged to cut out, first one and then the other of the two motor circuits, the connections being indicated at 2 and at 3 in Fig. 3 and the full circuits being shown for these two positions respectively in Figs. 7 and 8.

Figure 8:
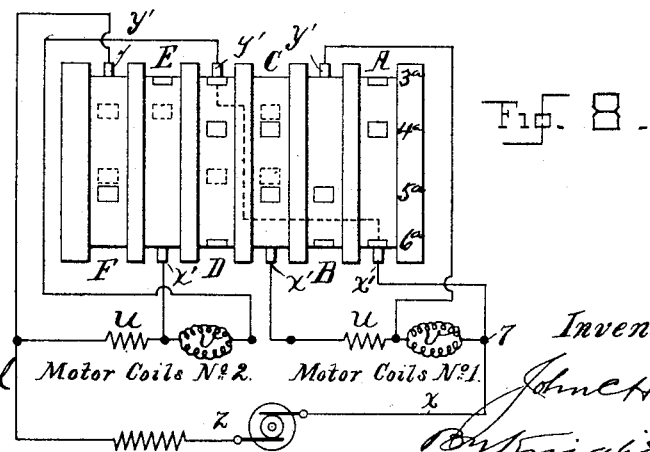

In Fig. 7, as shown, the contact brushes $x'$ and $y'$ in grooves A, B, D and E are not in contact with any contact plates. Motor coils No. 2 are therefore out of circuit and the circuit runs from dynamo $z$ through the wire $x$ to armature terminal 7, thence through motor coils No. 1 to contact in groove C by the buried wire connection 10 to the brush $y'$ running in groove F and thence by the return wire $y$ to the dynamo. The connections of Fig. 8 are similar, but in this position of the switch cylinder the other motor coils are in circuit and the motor coils No. 1 are out of circuit. A further turn of the switch makes the connections indicated at 4 in Fig. 3 and shown in full in diagram in Fig. 9 with the two motor circuits in series. The next turn of the cylinder makes the connections shown at 5 in Fig. 3 and indicated in full in the diagram Fig. 10 with one armature coil cut out and the other armature coil in series with the two field magnets in parallel. The last turn of the cylinder will make the connections indicated at 6 in Fig. 3 and shown in full in the diagram, Fig. 11 wherein one field winding is cut out and the two armatures in parallel are connected in series with the remaining field. These connections can, with the above explanation, be readily followed without further description.

While at the position No. 1, Fig. 3, the connection is such that the motor is doing the most work, in the intermediate position 4, it is working with the greatest torque and absorbing the least amount of current, while in the final position 6, it is absorbing the greatest amount of current and running at the highest speed.

Figure 9:
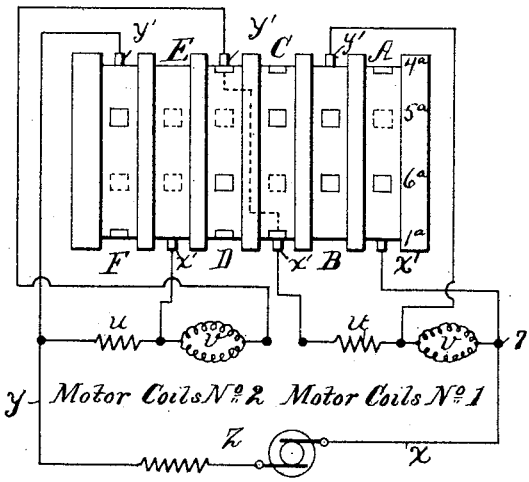
Figure 10:
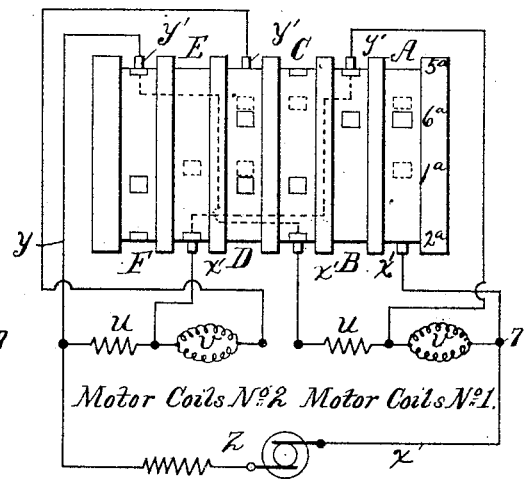
Figure 11:
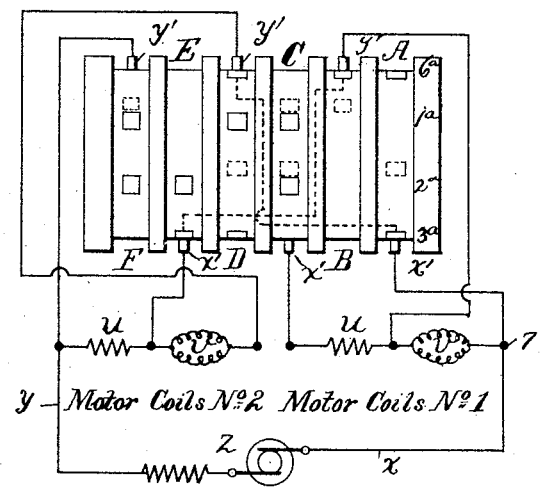

In Fig. 5, the cylinder is shown in the same position as in Fig. 9 but whereas in Figs. 6 to 11, I have omitted all the intermediate wires connecting the contact plates except those necessary for the coupling being made in the position of switch shown in the respective figures, I have in Fig. 5 shown all of the connections between the contact plates.

Having thus described my invention, the following is what I claim as new therein and desire to secure by Letters Patent:

1. In combination with two complete motor circuits, a switch having stationary contacts to which are attached the independent terminals of the armature and field coils, and connections movable with said switch and so arranged within such switch that each of the motor circuits can be placed in parallel or in series with the other or that one of them may be dropped from or added to the circuit.

2. A motor having two complete field and armature windings in combination with a switch so constructed as to cause one armature winding to revolve under the influence of current in both field windings or to couple the complete motor windings in series or in parallel.

3. A motor having two complete field and armature windings in combination with a single switch capable of placing both of the armature coils under the influence of current in a single field winding or of connecting said complete windings in series or in parallel.

4. In a motor, the integrally formed field core and pole pieces, in combination with cross-bars dove-tailed into the same, substantially as set forth.

5. The combination of the integrally formed field cores and pole-pieces and the supporting block dove-tailed to the same at the neutral point, substantially as set forth.

6. The combination in a motor of the pole pieces $l$, the cross-bar or yoke $a$ at the neutral point having suitable suspending devices, side bars $e, e$ hung on said yoke at one end and adapted to be hung on a car axle at the other, cross beam $b$ for supporting the motor from said side bars, and an armature journaled in said side bars, substantially as set forth.

7. The combination of the motor, its supporting side bars, having bearing for the armature shaft and the cross-beam of non-magnetic material separating and supporting the magnet limbs from the side bars.

8. In an electric railway the combination of a motor or motors mounted on a car having the field magnets and armatures wound with separate parallel wires, suitable terminal connections, and a single switch capable of connecting said conductors in series or in parallel or for connecting or disconnecting any of them to or from the circuit.

JOHN C. HENRY.

Witnesses:
J. M. AKERS,
F. W. GASKILL.